(12) United States Patent
Ekanayake et al.

(10) Patent No.: US 9,315,425 B2
(45) Date of Patent: Apr. 19, 2016

(54) MACROPOROUS CERAMIC BODY, METHOD OF MANUFACTURE AND USES THEREOF

(71) Applicant: UNIVERSITI BRUNEI DARUSSALAM, Gadong (BN)

(72) Inventors: Piyasiri Ekanayake, Gadong (BN); Mohammad Iskandar bin Pg Hj Petra, Gadong (BN)

(73) Assignee: UNIVERSITI BRUNEI DARUSSALAM, Gadong (BN)

( * ) Notice: Subject to any disclaimer, the term of this patent is extended or adjusted under 35 U.S.C. 154(b) by 83 days.

(21) Appl. No.: 14/064,496

(22) Filed: Oct. 28, 2013

(65) Prior Publication Data

US 2015/0118478 A1    Apr. 30, 2015

(51) Int. Cl.
*C04B 38/06* (2006.01)
*C04B 35/16* (2006.01)

(52) U.S. Cl.
CPC ............. *C04B 38/067* (2013.01); *C04B 35/16* (2013.01); *C04B 38/0615* (2013.01); *C04B 38/0655* (2013.01); *Y10T 428/249969* (2015.04)

(58) Field of Classification Search
CPC .. C04B 38/06; C04B 38/0605; C04B 38/061; C04B 38/067
USPC ......................................................... 264/610
See application file for complete search history.

(56) References Cited

U.S. PATENT DOCUMENTS

| | | | |
|---|---|---|---|
| 3,288,615 A * | 11/1966 | Estes et al. ........................ 501/85 |
| 3,950,175 A | 4/1976 | Lachman et al. |
| 5,296,180 A * | 3/1994 | Hayes et al. ...................... 264/44 |
| 5,298,205 A * | 3/1994 | Hayes et al. .................... 264/414 |
| 5,395,572 A * | 3/1995 | Brotz ................................. 264/43 |
| 5,705,118 A * | 1/1998 | Hayes et al. .................... 264/656 |
| 6,057,030 A | 5/2000 | Mano |
| 6,210,612 B1 * | 4/2001 | Pickrell et al. .................. 264/44 |
| 6,235,665 B1 * | 5/2001 | Pickrell et al. .................... 501/9 |
| 6,368,703 B1 | 4/2002 | Johnson |

(Continued)

FOREIGN PATENT DOCUMENTS

EP          0 395 399 A1     10/1990
WO      WO 91/15112 A1     10/1991

(Continued)

OTHER PUBLICATIONS

Kim, J., et al., "TBA-based freeze/gel casting of porous hydroxyapatite scaffolds," *Ceramics International*, 2011, vol. 37, pp. 2317-2322.

(Continued)

*Primary Examiner* — Russell Kemmerle, III
(74) *Attorney, Agent, or Firm* — Geeta Kadambi Riddhi IP LLC (57) ABSTRACT

The present embodiments disclosed herein are related to methods of preparing a macroporous ceramic body. According to some embodiments, a first mixture of ceramic-forming components is combined with a polymer network structure to form a second intermediate mixture comprising a polymer network. The polymer network is then removed in the drying and/or sintering step leaving an interconnected open pore network within the ceramic body. In some embodiments, the macroporous ceramic body comprises a three-dimensional, porous network comprising pores of about 3 mm to 11 mm.

14 Claims, 4 Drawing Sheets

(56) References Cited

U.S. PATENT DOCUMENTS

| | | | |
|---|---|---|---|
| 6,547,967 B1 | 4/2003 | Adler et al. | |
| 6,592,787 B2* | 7/2003 | Pickrell et al. | 264/44 |
| 6,773,825 B2* | 8/2004 | Pickrell et al. | 428/566 |
| 6,872,675 B2 | 3/2005 | Imhof et al. | |
| 7,556,755 B2* | 7/2009 | Shibata et al. | 264/44 |
| 8,025,838 B2 | 9/2011 | Neirinck et al. | |
| 8,114,335 B2 | 2/2012 | Conger et al. | |
| 8,545,895 B2 | 10/2013 | Gibson et al. | |
| 2001/0046608 A1* | 11/2001 | Pickrell et al. | 428/566 |
| 2004/0161596 A1 | 8/2004 | Taoka et al. | |
| 2009/0162414 A1 | 6/2009 | Hing et al. | |

FOREIGN PATENT DOCUMENTS

| | | |
|---|---|---|
| WO | WO 92/19369 A1 | 11/1992 |
| WO | WO 98/43927 A2 | 10/1998 |
| WO | WO 99/43631 A1 | 2/1999 |
| WO | WO 03/024892 A1 | 3/2003 |
| WO | WO 2004/011390 A1 | 2/2004 |
| WO | WO 2009/019305 A2 | 2/2009 |
| WO | WO 2009/029276 A1 | 3/2009 |
| WO | WO 2009/053835 A2 | 4/2009 |
| WO | WO 2013/137727 A1 | 9/2013 |

OTHER PUBLICATIONS

Park, S., et al., "Macroporous Membranes with Highly Ordered and Three-Dimensionally Interconnected Spherical Pores," *Adv. Mater.*, 1998, vol. 10(13), pp. 1045-1048.

Peña, J., et al., "An alternative technique to shape scaffolds with hierarchical porosity at physiological temperature," *Acta Biomaterialia*, 2010, vol. 6, pp. 1288-1296.

Vakifahmetoglu, C., et al., "Highly porous macro- and micro-cellular ceramics from a polysilazane precursor," *Ceramics International*, 2009, vol. 35, pp. 3281-3290.

Luyten, J., et al., "Designing With Pores—Synthesis and Applications," *KONA Powder and Particle Journal*, 2010, No. 28, pp. 131-142.

Okada, K., et al., "Porous ceramics mimicking nature—preparation and properties of microstructures with unidirectionally oriented pores," *Sci. Technol. Adv. Mater.*, 2011, vol. 12, pp. 1-11 (from IOP.com).

Studart, A., et al., "Processing Routes to Macroporous Ceramics: A Review," *J. Am. Ceram. Soc.*, 2006, vol. 89(6), pp. 1771-1789.

\* cited by examiner

MACROPOROUS CERAMIC BODY, METHOD OF MANUFACTURE AND USES THEREOF

FIELD

The invention disclosed herein generally relates to methods of producing a macroporous ceramic body comprising large pore sizes. The macroporous ceramic bodies described herein comprise open, three-dimensional, interconnected pore network and have a pre-determined porosity and pre-determined pore connectivity.

BACKGROUND

Ceramic materials have important industrial applications, and generally comprise natural porosity. Often, the natural porosity is determined by the composition and the grain structure of the raw materials. The ceramic materials require good thermal stability, thermal and electrical insulation, good refractory properties and reduced weight. The natural porosity is, in most instances, insufficient to confer such properties to the ceramic materials.

Ceramic materials with higher porosity levels than those of natural porosity can be obtained by various methods known in the art. Most often, such higher levels of porosity can be achieved by using porogens or pore-forming materials such as graphite, polymer beads or fibers which can be removed in subsequent heating steps without leaving any residues.

Even though higher porosity levels are desirable for many applications, introducing higher porosity levels also decrease the mechanical strength of the ceramic materials. This problem is partially addressed by prior art methods, for example, by controlling the homogeneity of pore size distribution. In these instances, a homogenizing agent is added to the ceramic precursor mixture to control the pore size distribution.

Additionally, most of the known methods lack the ability to prepare ceramic materials with pre-determined porosity and pre-determined pore connectivity. Ceramic materials with three-dimensional network of interconnected pores can have several important technological applications. Furthermore, it is impossible to use any of the known methods to prepare porous ceramic materials with large pore sizes, especially in the range of 3 mm to 11 mm. Based on the literature, the macroporous ceramic materials can only be obtained using high tech ceramics such as yttrium, zirconium and alumina based ceramic forming materials. Even with such high tech ceramics, it is not possible to obtain microporous ceramics with pore sizes of larger than 1-2 mm.

U.S. Pat. No. 6,547,967 to Adler et al. discloses a method of forming a ceramic network. According to Adler, a fiber network is impregnated with a ceramic suspension, the resultant intermediate is dried, fiber network is removed, and the resultant structure is sintered to obtain the ceramic struts. Upon the removal of fiber network, a network of cavities, akin to a capillary network (as determined by the fiber network) is created based on the fiber network. The ceramic struts are interconnected via cavities. Adler's method does not create a network of cavities and pores, and as such this method does not create a network of interconnected pores. In this method, the cavities are not interconnected via a network of three-dimensional pores. Adler's method produces cavities of size about 150 µm and 350 µm (Example 1 and 2). High tech ceramics such as SiC and $Al_2O_3$ have been used in this method.

As such, it is advantageous to discover a cost-effective, efficient and viable method to prepare macroporous ceramic materials.

SUMMARY

The methods disclosed herein are related to methods of preparing macroporous ceramic bodies. In one aspect, methods disclosed herein are used to prepare a macroporous ceramic material/body comprising pore sizes between about 3 mm to 11 mm.

Some embodiments are directed to a method of preparing a macroporous ceramic body having a three-dimensional, porous network comprising the steps of combining a first mixture comprising ceramic-forming components with a three-dimensional polymer network structure to form a second intermediate mixture comprising a polymer network and drying and sintering the second intermediate mixture to prepare the macroporous ceramic body. The polymer network structure of these embodiments comprises three-dimensional, interconnected figures.

Some other embodiments are directed to a macroporous ceramic body comprising a three-dimensional pore network, wherein the macroporous ceramic body comprises pores of about 3 mm to 11 mm.

DETAILED DESCRIPTION OF THE DRAWINGS

DETAILED DESCRIPTION

Certain embodiments as disclosed herein provide for methods of preparing a macroporous ceramic body comprising interconnecting, three-dimensional, pore network having pore sizes of higher than 50 nm. Some particular embodiments are directed to methods of preparing a macroporous ceramic body comprising interconnecting three-dimensional, pore network having pore sizes of between about 3 mm to about 11 mm.

After reading this description, it will become apparent to one skilled in the art how to implement the invention in various alternative embodiments and alternative applications. However, although various embodiments of the present invention will be described herein, it is understood that these embodiments are presented by way of example only, and not limitation. As such, the detailed description of various alternative embodiments should not be construed to limit the scope or the breadth of the invention.

According to IUPAC nomenclature, porous ceramic materials can be divided into three groups. The microporous ceramic materials are those with pore widths (d) less than 2 nm, and the mesoporous ceramic materials contain pore widths between 2 nm and 50 nm. The macroporous ceramic materials comprise pore widths higher than 50 nm. As disclosed herein the terms "ceramic material" and "ceramic body" have been used interchangeably and carry the same meaning throughout this disclosure.

Macroporous ceramic materials find many applications in everyday life, including for example, polymeric foams for packaging, light-weight structures in buildings and airplanes, filtration media for liquids and gases, filtration media for molten metals, high temperature thermal insulation, support for catalytic reactions and filtration of hot corrosive gases in various industrial processes. The porous ceramics are especially advantageous because of their high melting point, tailored electronic properties, high corrosion resistance and wear resistance. Additionally, in macroporous ceramic materials, the solid materials are replaced by large voids conferring these materials special properties such as low thermal mass, low thermal conductivity, controlled permeability, high surface area, low density, high specific strength and low dielectric constant. The large pores are particularly attractive because the rough surface structure of the final ceramic body facilitates the adhesion and retention of coatings and catalysts applied to the ceramic.

The properties of ceramic materials can be tailored for each specific application by controlling the composition and microstructure of the porous ceramic. Changes in open and closed porosity, pore size distribution, and pore morphology can affect the properties of the ceramic material. All these features are highly influenced by the processing route used for the production of the porous ceramic material.

The most known route for the preparation of porous ceramic materials is the partial sintering or initially porous powder compacts or the sintering of powder mixtures that undergo solid state reactions leading to pore formation.

In addition to this method, several novel approaches of preparing porous ceramic materials have been reported. These techniques enable one to tune the porosity, pore morphology and size distribution.

The replica method is based on the impregnation of a cellular structure in a ceramic suspension or precursor solution. This process produces macroporous ceramic materials with the same morphology as the original porous material. The sacrificial template technique consists of the preparation of a biphasic composite comprising a continuous matrix of ceramic particles or ceramic precursors and a dispersed sacrificial phase that is initially homogenously distributed throughout the matrix and is ultimately extracted to generate pores within the microstructure. This method leads to porous materials displaying a negative replica of the original sacrificial as opposed to the positive morphology obtained from the replica technique described above. In direct foaming methods, porous ceramic materials are produced by incorporating air into a suspension of liquid media, which is subsequently set in order to keep the structure of air bubbles created. The consolidated foams are sintered afterwards to obtain the macroporous ceramics. In all these cases, the pore sizes are limited to about 1000 μm. See Studart et al., *J. Am. Ceram. Soc.*, 89(6) 1771-1789 (2006).

To best of our knowledge, none of the known methods can be used to prepare macroporous ceramic materials with three-dimensional, open pore network, wherein the ceramic materials comprise low cost ceramics such as feldspar. Even to achieve the highest pore sizes to date, of about 1 mm, use of high tech ceramics is required. It is believed that these high tech ceramics provide the mechanical strength to the macroporous ceramics because of their inherent, unique properties. Porous ceramic materials with three-dimensional pore networks are useful as catalysts, catalyst supports, filters, scaffolds, adsorbents and the like because of high accessibility of their pores. Additionally, none of the known methods can be used to prepare macroporous ceramic materials with pore sizes in the range of 3 mm to 11 mm.

One aspect of the present invention is a method of preparing a macroporous ceramic body having a three-dimensional, controlled open pore network, comprising the steps of providing a first mixture comprising ceramic-forming components, combining the first mixture with a three-dimensional polymer network structure to form a second intermediate mixture comprising a polymer network and drying and sintering the second intermediate mixture to obtain the macroporous ceramic body/material. The three-dimensional polymer network in these embodiments comprises three-dimensional, interconnected figures. Some embodiments can also contain two-dimensional interconnecting figures of any shape (e.g., circles, squares etc.) "Interconnected figures" in this context means figures or bodies that are connected each other. In some embodiments, the figures are interconnected via the contact surfaces of adjacent figures. As discussed throughout this specification, a polymer network comprising such arrangement would lead a network of cavities interconnected via a network of pores in the ceramic body, upon removal of the polymer network by drying and/or sintering.

According to one aspect of the invention, the macroporous ceramic body comprises a three-dimensional, controlled open pore network. "Controlled open pore network" in this context means that the pore network is predetermined by shape, size, pattern/morphology of the polymer network that is combined with the first mixture comprising polymer-forming components. For example, polymer network can be formed by various polymeric shapes, such as squares, rectangles, circles, or three-dimensional figures such as spheres or boxes and the like. In some particular embodiments, the polymer network comprises polymer beads. Accordingly, once combined with the first mixture to form the second intermediate mixture, followed by drying and sintering, the polymer network comprising polymer beads would form a network of spherical cavities interconnected via a three-dimensional network of open pores. In some embodiments, the three dimensional network of pores nearly corresponds to ABCABC hexagonal structure. Accordingly, the connectivity can be increased up to 8 per spherical cavity.

Some other embodiments are directed to a method of preparing a macroporous ceramic body having a three-dimensional, controlled open pore network, comprising the steps of providing a first mixture comprising ceramic-forming components, combining the first mixture with a three-dimensional polymer network structure to form a second intermediate mixture comprising a polymer network and drying and sintering the second intermediate mixture to obtain the macroporous ceramic body/material. In these embodiments, the macroporous ceramic body further comprises cavities, wherein at least one cavity is in communication with another cavity through a pore.

According to some embodiments of disclosed herein, the polymer network structure comprises three-dimensional, interconnected figures. Such a polymer network can be made according to any of the known methods in the art. For example, a desired pattern can be made using an appropriate mold. In some embodiments, the figures form cavities and the interconnections between the figures form the pores, such that an interconnecting network of pores is created within the ceramic body upon the removal of the polymer network structure during the drying and sintering steps. In these embodiments, the pre-formed and molded polymer network structure determines the morphology of the pores (e.g., size, shape and the like). Advantageously, a similar polymer network can be formed using an alternative method. According to these embodiments, the distinct figures, such as polymer beads can be added to a mold, and the contacting surface of the adjacent figures can be manipulated by applying an appropriate pressure. Accordingly, application of a higher pressure packs the figures tightly, increasing the contact surface between each other, and in turn resulting bigger pore sizes. Conversely, application of a lower pressure results in a decreased contact surface between the figures, resulting smaller pore sizes. In these embodiments, the figures are made of appropriate polymers/mixtures that give them a compressible character. For example, some embodiments contain polymer beads made up of polystyrene. This is in contrast to U.S. Pat. No. 6,547,967, which uses a fiber network to create a network of cavities within a ceramic network. In fact, the method disclosed in U.S. Pat. No. 6,547,967 cannot create an interconnected pore network. Instead, this method creates a network of cavities as determined by the fiber network. In contrast, presently disclosed embodiments create a network of cavities which are interconnected by a network of pores.

In some embodiments, the macroporous ceramic material comprises cavities in addition to pores. The cavities can have varying morphology, i.e., various shapes, and can be arranged in a predetermined pattern. In some embodiments, these cavities can be of uniform shape or mixed with different shapes (for example, spherical cavities mixed with cavities that are square shaped). In some embodiments, the cavities are spherical. The cavities are interconnected through the pores. The pores can be of various shapes depending on the polymer network structure. In some embodiments, the pores are of circular shape. In some embodiments, each cavity contains maximum of 12 pores.

The pores can be created by the arrangement of different shaped polymer particles in the polymer network. For example, in embodiments where the polymer article is a spherical bead, the beads can be arranged such that they interconnect with each other. In some embodiments, the polymer beads are made of compressible polymer materials such that by applying a small force, the beads can be made to interconnect and pack together. The cross sectional area of the contact surface between the interconnecting beads can be varied by applying varying amounts of force. For example, if a higher force is applied, then the beads would pack closely together, and the contact surface area between the beads/particles will increase. Conversely, if a lesser force is applied, the contact surface area between the beads/particles will decrease. Accordingly, by varying the amount of pressure, the contact surface area between the particles/beads can be increased or decreased. The increased contact surface area between polymer beads or particles creates a wider/larger pore structure when the polymer particles are consumed (e.g., burned) during the subsequent drying and sintering steps. Similarly, the decreased contact surface area would lead to small-sized pores. In this fashion, the cross sectional area or the pore size of the final ceramic materials can be pre-determined and controlled. In some embodiments, a pressure of about 3500 to 18000 $Nm^{-2}$ is applied to the ceramic beads comprising polystyrene.

The preformed polymeric network acts as a sacrificial structure. For example, the network of polymeric beads/particles can be removed by action of heat or by chemical agents. In some embodiments, the network of polymeric beads/particles can be removed by action of heat or temperature. After this step, voids correspond to the polymer network of particles/beads are left in the ceramic structure/body. As discussed above, the pore sizes depend on how much pressure was applied, i.e., how compressed the polymer particles/beads in the polymer network structure. The pore sizes are constant if the previously made polymeric network contains equal-sized beads/particles. Accordingly, in some embodiments, different sizes of pores can be obtained by incorporating polymer particles/beads of different sizes. As such, some of the embodiments can have macroporous ceramic materials with inhomogeneous porosity. Similarly, by controlling the size of the particles/beads of the polymer network, a macroporous ceramic material with homogenous porosity can be produced.

In presently disclosed embodiments, it is particularly advantageous to use a pre-formed polymer network structure to create the desired pore network pattern. In the methods disclosed in the art, the sacrificial materials are dispersed within the ceramic slurry. As such, contrary to the methods disclosed herein, the known processing methods are not amenable to form a network of pores. In these methods, the random distribution of sacrificial materials leads to a random arrangement of pores. As such, the prior art methods do not allow for the control of three-dimensional arrangement of network of pores. Since the arrangement, morphology, size-distribution of pores and the like of the three-dimensional network of pores can be pre-determined based on the pre-formed polymer network structure, advantageously, the three-dimensional pore network can be tailored to fit a particular application as it deems necessary. In these embodiments, the pore size is not limited to 3 mm to 11 mm. Macroporous ceramic materials having any pore size can be prepared using the methods disclosed herein.

In some embodiments, when the polymer network comprises three-dimensional particles such as beads, cavities are introduced to the macroporous ceramic material. In some embodiments, these cavities present themselves as a network of cavities. Various patterns and designs can be created using the present methods. In some embodiments, the network of cavities is interconnected via a network of open pores. Such a network of cavities and pores results in an increase in the internal surface area of the ceramic material.

Some of the embodiments provide multi-layered ceramic bodies. In some of these embodiments, the different layers have the same porosity. In some of the other embodiments, the different layers have different porosity. In some of these embodiments, such ceramic bodies can be made by combining the first mixture comprising ceramic-forming components with layers of polymeric network structures. In some of these embodiments, the polymeric network structures comprise polymeric particles. In some of these embodiments, the polymeric particles are polymeric beads. In these embodiments, each layer of the polymeric network structure comprises layers of polymer beads of different sizes (i.e., each layer comprises beads having a size different from the size of the beads of the neighboring layer.) In some embodiments, the polymer beads are of substantially uniform size. "substantially uniform size" in this context means at least 50%, 55%, 60%, 65%, 70%, 75%, 80%, 85% or 90%-99% pores are of the same size.

The "ceramic-forming components" are any of the ceramic-forming material known in the art. The ceramic-forming components are selected from the group consisting of kaolin, clay, ball clay, feldspar, montana, talc, alumina, kyanite, quartz, pyrophillite, silica, silicon carbide, cordierite-forming materials (alumina, silica and that may further include one or more of clay, talc, titania as well as alkaline earth metals), chamotte, mullite, zirconia, yttrium oxide, titanium oxide, magnesium oxide, calcium oxide, barium oxide, pegmatite, aluminum titanate, inorganic metal oxides, metal alloys, Ti—V—Al alloys, Ti—V—Zr alloys, Ti—V—Zr—Nb alloys, Al—Cu alloys, Cr—V alloys, oxides such as but not limited to $Al_2O_3$, $ZrO_2$, $TiO_2$, HfO, MgO, ZnO, $BaTiO_2$, $SrTiO_3$, $CaTiO_2$, CaO, $Y_2O$, $CeO_2$, $Fe_2O_3$, FeO, $SiO_2$; borides such as but not limited to $TiB_2$, $ZrB_2$, $B_4C$, $AlB_2$, $HfB_2$, $VB_2$, $CrB_2$, $MO_2B_5$, $W_2B_5$; nitrides such as but not limited to ZrN, TiN, $Si_3N_4$, HfN, NbN, VN, TaN, AN, $Si_2N_4$, BN, SiAlON; carbides such as but not limited to SiC, TiC, ZrC, HfC, VC, NbC, CaC, Cr$_3$C$_2$, MO$_2$C, WC, V$_2$C, Nb$_2$C, Ta$_2$C, B$_4$C, fluorides, glasses like pyrex (or borosilicate glass); potassium borosilicate, Li$_2$Si$_2$O$_5$, oxy fluoride ceramics such as but not limited to [Al$_2$O$_3$, MgO, CaO, SiO$_2$ glass]. [PbO, SiO$_2$ glass], [B$_2$O$_3$, SiO$_2$, Na$_2$O glass], [MgO, Al$_2$O$_3$, SiO$_2$ glass] or [CaSiO$_3$, CaMgSi$_2$O$_6$, CaAl$_2$Si$_2$O$_8$ glass], phosphates such as but not limited to calcium phosphate, hydroxyapatite, LaPO$_4$, CePO$_4$, sinterable thermoplastic polymers and steatite.

Generally, porous ceramic materials with good mechanical strengths can be obtained by using expensive metal oxides such as Y$_2$O$_3$, ZrO$_2$ and Al$_2$O$_3$. The properties of these metals as well as crystal lattice arrangement of the metal-oxide complex believed to be responsible for the mechanical strength.

Surprisingly, and unexpectedly, it was found that low cost ceramic forming materials such as feldspar, kaolin, quartz and ball clay and the like can be used to prepare macroporous ceramic bodies. In some embodiments, the ceramic-forming components comprise feldspar and one or more components selected from quartz, ball clay and kaolin. In some other embodiments, the ceramic-forming components comprise 34-40% (w/w) of feldspar and one or more components selected from quartz, ball clay and kaolin. In some of these embodiments, the ceramic-forming components comprise one or more components of quartz, ball clay or quartz is/are of at least about 17% (w/w). In some particular embodiments, the ceramic-forming components comprise about 34-40% (w/w) of feldspar, about 17-23% (w/w) of quartz, about 17-24% (w/w) of ball clay and about 18-24% (w/w) of kaolin. As such, in some embodiments, the first mixture comprises about 34-40% (w/w) of feldspar, about 17-23% (w/w) of quartz, about 17-24% (w/w) of ball clay and about 18-24% (w/w) of kaolin. It is understood that any of the above components are mixed together such that total weight percentage of these components (ceramic-forming components) would amount to 100% of weight percentage of ceramic—forming components. Accordingly, in these embodiments, the constitution of the finished ceramic material/ceramic body following the drying and sintering steps would be the same.

The preformed polymer network can be designed to incorporate any pattern or design as required by the particular application. In some embodiments, the polymeric network comprises polymeric particles. In some of the other embodiments, the polymeric network comprises polymeric beads. In some of these embodiments, the polymeric beads are tightly packed and are in close contact with each other. The polymeric beads can be of any shape. In some embodiments, the polymeric beads/particles can be of homogeneous shape or can be intermixed with various different shapes. In some embodiments, the polymeric beads are spherical beads.

Generally, the polymeric network is made of any of the polymeric or chemical agents that can be used as sacrificial structures in the porous ceramic art. That is, any polymers or chemical agents that can be removed after creating the polymeric network within the first mixture comprising ceramic-forming components can be used in the presently disclosed methods. In some embodiments, the polymeric network is made up of polymeric or chemical agents selected from the group consisting of PVC beads, polystyrene beads, polyethylene oxide (PEO) beads, ethylcellulose, cellulose-based materials, polyvinylbutyryl (PVB), polyvinyl alcohol, polymethylmethacrylate (PMMA), polyethylene glycol (PEG), phenolic resins, nylon, cellulose acetate, polymeric gels, naphthalene, polybutylene, polymethylpentene, polyethylene, polypropylene, polystyrene, polyamides, epoxies, acrylonitrile butadiene styrene, acrylics, polyesters and mixtures thereof. In some other embodiments, the polymer network is made up of carbon (e.g., graphite, activated carbon, petroleum coke, carbon black), starch (e.g., corn, barley, bean, potato, rice, tapioca, pea, sago, palm, wheat, canna), gelatin, glucide, sucrose, dextrin, wax, alginate and mixtures thereof. In some embodiments, the polymeric network is made up of styrene-based polymers. In some other embodiments, the polymeric network is made up of polystyrene. In some embodiments, the polymeric network is made up of a suitable polymer that can be compressed upon application of some degree of pressure. In some embodiments, the polymeric network comprises polymer beads made up of polystyrene.

The use of a polymer network structure allows pre-determining the porosity of the ceramic bodies. The polymer network structure can be made by including polymer articles in a vessel/mold and pressing together such that each polymer particle compresses or sticks with the neighboring polymer particles. In some embodiments, the size of the polymer particle determines the size of the pores. In some of the embodiments, the polymer particles are polymer beads or spherical bodies. In some of these embodiments, the polymer bead size is about 9 mm.

In some embodiments, the polymer particles/beads are attached to each other by using a suitable coating agent. In these embodiments, the coating agent can be selected from the group consisting of polyurethane, synthetic or natural adhesives, acrylic polymers, cyanoacrylate, silicone, epoxy adhesives, polyvinyl acetate, natural rubber, nitrocellulose, molten beeswax, bioadhesives and the like. In some other particular embodiments, in the polymeric network comprising polymer beads, the beads are bonded to each other by a coating of polyurethane. In some of the embodiments, the coating can be done, for example, by rolling the polymer beads on a polyurethane coated flat surface.

In some embodiments, the first mixture comprising the ceramic-forming components further comprise a suitable binder. In some of these embodiments, the binder is selected from the group consisting of sodium silicate, sodium stearate, methylcellulose, methocel, polyvinyl alcohol, polyethylene glycol, polyvinyl acetate, silanes and mixtures thereof, and other binders known in the art. In some embodiments, the first mixture comprising feldspar, quartz, ball clay and kaolin further comprises sodium silicate. In some of these particular embodiments, the first mixture comprising about 34-40% (w/w) of feldspar, about 17-23% (w/w) of quartz, about 17-24% (w/w) of ball clay and about 18-24% (w/w) of kaolin, further comprises 0.5 g of sodium silicate per 100 g of the ceramic mixture. Not wishing to be bound by theory, it is believed that the mechanical strength of the ceramic body is improved by addition of a binder. In some embodiments, the ceramic body comprising a binder has a particle size of between about 45-55 µM. In some of these embodiments, the particle size is of about 53 µM.

Some particular embodiments are directed to a method of preparing a macroporous ceramic body with controlled porosity, wherein the method comprising, first, the preparation of the polymer network. Accordingly, spherically-shaped polystyrene beads are coated with polyurethane and the coated beads are pressed in a cylindrical mold. A piston can be used for pressing the coated beads. Next, a first mixture comprising ceramic-forming components (e.g., a ceramic slurry) is extruded on to the polystyrene network structure. Then this intermediate mixture is dried first, in air and in an oven. The drying in the oven removes the polystyrene network structure leaving the corresponding foot print (which forms the porous network within the ceramic body). Finally, this dried composition is sintered to obtain the ceramic body/structure. In some of these embodiments, a varying pressure in about 3,500 to 18,000 $Nm^{-2}$ is applied to modulate the contact surface area of adjacent beads, which in turn controls the final porosity of the ceramic body.

The major obstacle in the preparation of macroporous ceramic bodies is the poor mechanical strength of the ceramic bodies comprising larger pores. These macroporous ceramic bodies have the propensity to develop cracks during the drying and sintering process, when the ceramic composition is undergoing various physical changes as well as possible chemical changes. It may be possible to prevent developing cracks during the drying and/or sintering process, however, it requires meticulous and time-consuming monitoring of the conditions, advanced production techniques or expensive equipment.

Surprisingly and unexpectedly, it was found that by introducing a suitable drying curve, the development of cracks and structural flaws can be prevented or minimized, or in some instances, completely eliminated. Using the drying curve and/or sintering curve disclosed herein, a macroporous ceramic material/body with improved mechanical strength can be produced. The mechanical strength of the macroporous ceramic bodies can be determined by any of the known methods in the skill of art. For example, ASTM C1674-11 method, which is Standard Test Method for Flexural Strength of Advanced Ceramics with Engineered Porosity (Honeycomb Cellular Channels) at Ambient Temperatures can be used to determine the mechanical strength of the macroporous ceramic bodies. Accordingly, in some embodiments, the drying step is carried out in at least three steps. Each step is performed at an incremental higher temperature than the previous step/temperature. The holding time can be varied or it could be the same for all the steps. In some of these embodiments, the drying is carried out, first at about 80° C. for about 2 hours, then at about 140° C. for about 2 hours, and then at about 350° C. for about 2 hours. In these embodiments, the rate of increasing the temperature is about 1° C. per minute.

Figure 1:
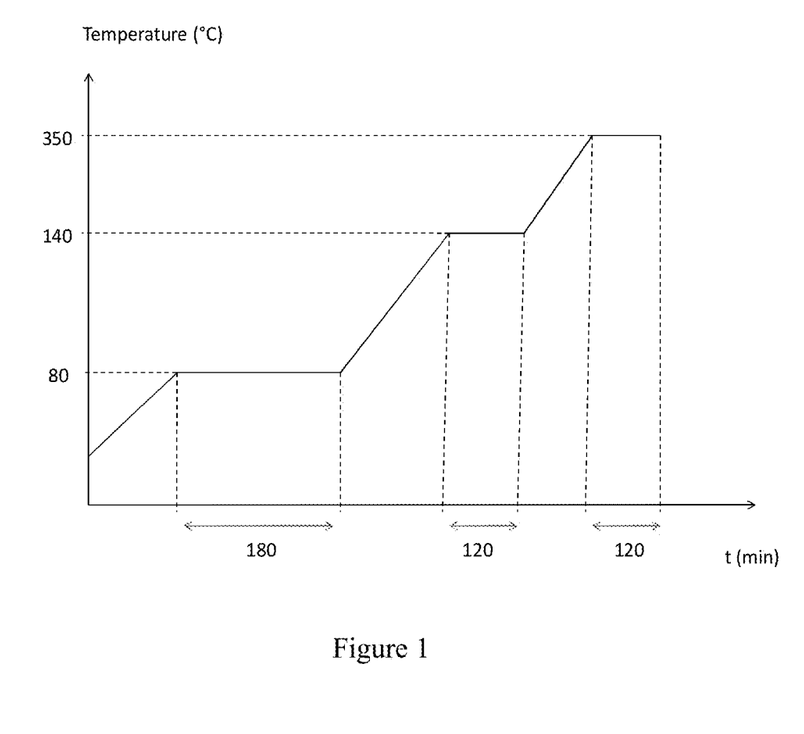
FIG. 1 shows the drying curve of Example 1.

FIG. 1 shows a drying curve according one embodiment of the invention. Accordingly, the second intermediate mixture of Example 1, first air dried for about 16 to 30 hours depending on the porosity. This air dried mixture was then gradually heated up to about 80° C. for about 60 minutes at a rate of 1° C./min in an oven. The temperature was held constant at about 80° C. for about 180 minutes. This mixture was then gradually heated up to about 140° C. for about 60 minutes at a rate of 1° C./min. The temperature was held constant at about 140° C. for about 120 minutes. In the final step, this mixture was gradually heated up to about 350° C. for about 210 minutes at a rate of 1° C./min.

This intermediate structure is then subjected to a sintering step. In one aspect, the sintering is carried out at a temperature between about 1000° C. to about 2000° C. In some of the embodiments, the sintering is carried out at a temperature between about 1000° C. to about 1500° C. In some particular embodiments, the sintering is carried out at a temperature of about 1240° C. The sintering step is carried out for about 100 to about 200 minutes. In some embodiments, the sintering step is carried out for about 150 minutes. Accordingly, in some embodiments, the sintering step is carried out at a temperature of about 1240° C. for about 150 minutes.

Figure 2:
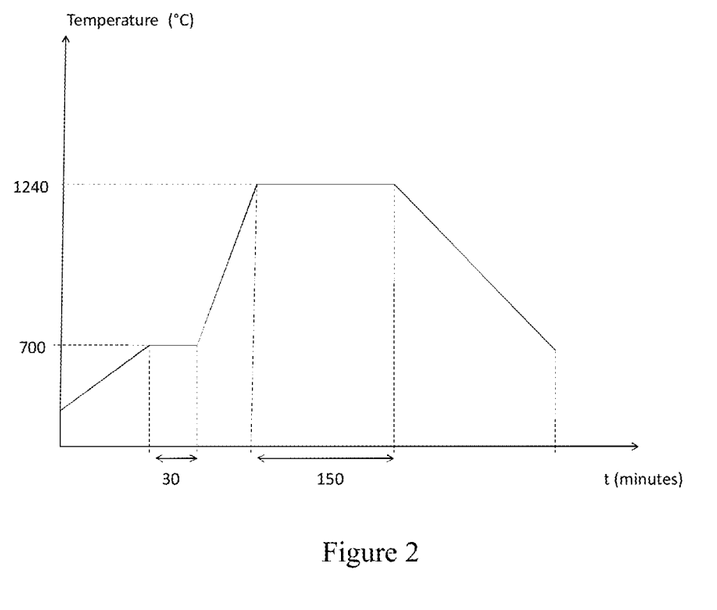
FIG. 2 shows the sintering curve of Example 1.

FIG. 2 shows the sintering curve according to one embodiment of the invention. Accordingly, the dried intermediate (using the drying curve of FIG. 1) was gradually heated up to about 700° C. for about 135 minutes at a rate of 5° C./min. The temperature was held constant at about 700° C. for about 30 minutes. The temperature was then gradually increased to about 1240° C. for about 55 minutes at a rate of 10° C./min.

The temperature was kept constant at about 1240° C. for about 150 minutes. The mixture is then cooled to room temperature.

Without wishing to be bound by theory, it is believed that particular drying curve and the particular sintering curve play a major role in unexpected and surprising mechanical strength of the macroporous ceramic bodies obtained by the methods disclosed herein. In addition to the unexpected and surprising mechanical strength, no major structural flaws or cracks were detected.

Figure 3:
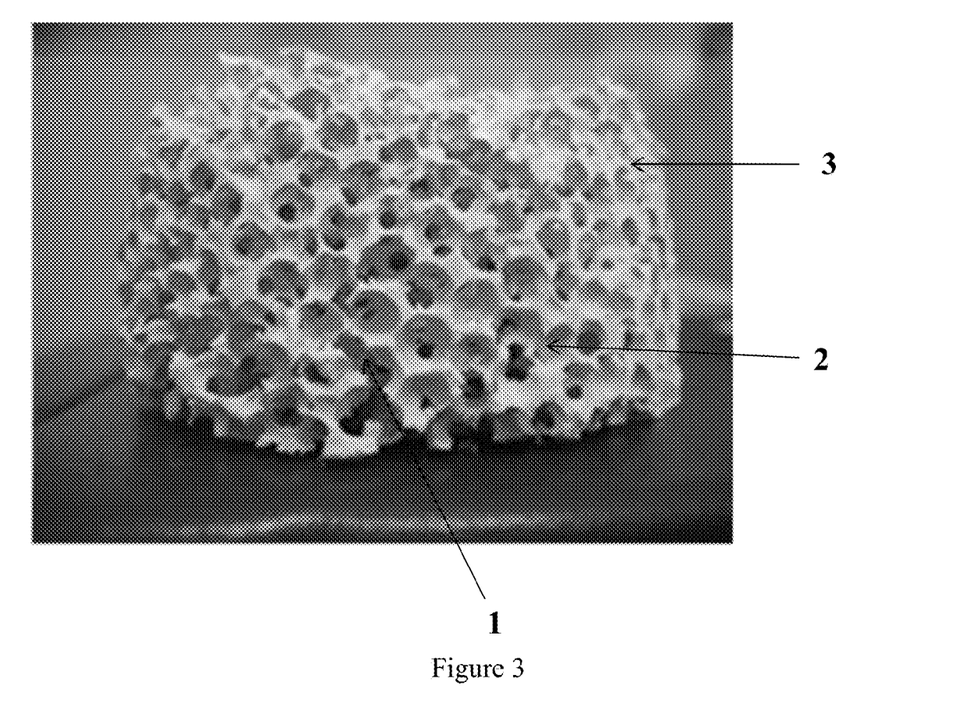
FIG. 3 shows the resulting ceramic body of Example 1.

FIG. 3 shows a ceramic body 3 according to the exemplary embodiment disclosed herein. The ceramic body 3 comprises substantially spherical cavities 1 throughout the body. The cavities 3 are interconnected by a three-dimensional network of pores 2.

Presently disclosed methods provide macroporous ceramic bodies with pores larger than about 1 mm. In some embodiments, the macroporous ceramic bodies comprise pores larger than about 2 mm. In some other embodiments, the macroporous ceramic bodies comprise pores larger than about 3 mm. In some of these embodiments, the macroporous ceramic bodies comprise pores larger than about 3 mm to about 20 mm. In some of the embodiments, the macroporous ceramic bodies comprise pores larger than about 3 mm to about 11 mm.

To best of our knowledge, the present methods provide the first instance of macroporous ceramic bodies with pores larger than 3 mm, with appreciable mechanical strength. Additionally, using present methods, macroporous ceramic bodies with pre-determined porosity, pre-determined pore connectivity and three dimensional network of interconnected pores can be produced. These macroporous ceramic bodies therefore provide various applications or avenues that were previously not available in the knowledge of art. The possible uses of these macroporous materials can include filters, porous medium combustion technology, moisture absorption, water absorption, sound absorption, adsorption, deodorization, catalytic reaction beds, health products, diffusion plates, reactors, shock-absorbing materials, light materials, catalyst carriers, solid catalysts, heat insulators, refractory materials, biomaterials, electromagnetic wave shields, fertilizers, weedicides, pesticides and other active agent supports and the like.

Figure 4:
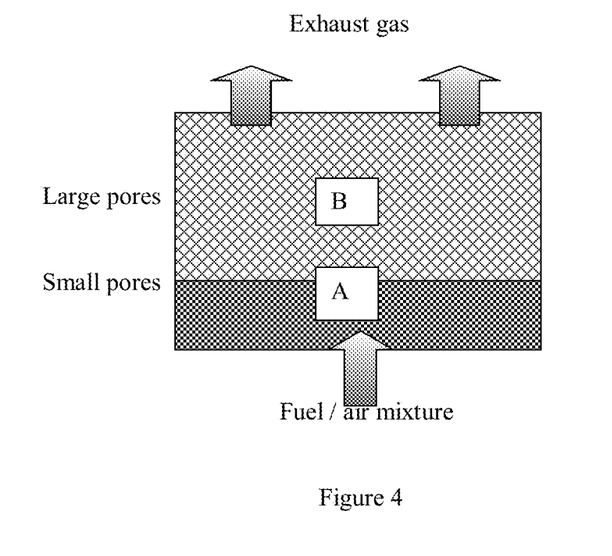
FIG. 4 shows a porous medium burner including porous ceramic bodies of certain embodiments disclosed herein.

FIG. 4 shows one application of some embodiments of the present invention as a porous medium burner. FIG. 4 is a schematic of a porous medium burner. There are two zones having different pore sizes in a single porous ceramic structure. The zone A is called the pre mixing or pre heating zone. The zone B is called the combustion zone. The pore sizes of the zone A are relatively smaller than the pore sizes of zone B. Smaller pore size prevents the propagation of flame inside the porous ceramic structure. In zone A, the fuel-air mixture is circulating and gets mixed well without catching fire. When the fuel-air mixture arrives to zone B, the mixture gets combusted and propagated throughout the porous ceramic structure and stabilizes the internal combustion inside the porous ceramic body. The fuel-air mixture gets combusted as soon as the fuel-air mixture meets the combustion zone since the fuel air mixture is pre heated at the pre mixing area. Therefore, the burning efficiency is quite high in the porous medium burners. In addition due to the circulation of unburned gases inside the heated pores, the unburned gases undergo an efficient combustion. As such, the emission of CO and $NO_X$ is relatively low in this case than in free flame burning process.

One aspect of the presently disclosed methods is to provide "tailored" porous ceramic bodies. The pore morphology, pore size distribution, pore size, pore connectivity can be predetermined and controlled, such that macroporous ceramic bodies tailored for particular purpose(s) can be prepared using the disclosed methods. For example, the multi-layered, macroporous ceramic bodies with different pore sizes in each layer can be used as a reaction support for complex reactions. As the reaction progresses, the products and/or byproducts can be separated as in size exclusion chromatography. Accordingly, the porous ceramic body can be tailored either to retain or exclude certain reaction products/by products.

In some of the embodiments, cavities and pores can be made by combining a polymer network structure with a first mixture comprising ceramic-forming components. In some of these embodiments, a polymer network structure can be embedded/impregnated within the first mixture comprising ceramic-forming components, for example, where the latter is in the form of a ceramic slurry. In some other embodiments, cavities and pores are made by extruding a first mixture comprising ceramic-forming components into a polymeric network structure. In some of these embodiments, the polymer network structure comprises spherically-shaped polystyrene beads. In some of these embodiments, the diameter of polystyrene beads is between about 3 mm to about 11 mm. The polystyrene beads can be bonded to each other by coating with polyurethane. In some of the embodiments, the coated polystyrene beads are packed in a mould and are further compressed to make a polymeric network structure comprising tightly packed/interconnected polymer beads comprising polystyrene beads.

Some embodiments are directed to a macroporous ceramic body comprising a three-dimensional pore network. In some of these embodiments, the macroporous ceramic body comprises pores of larger than about 3 mm. In some of these embodiments, the pores are of about 3 mm to 11 mm. In some of the embodiments, the macroporous ceramic body comprises a three-dimension pore network. In some of these embodiments, the three-dimensional pore network is a hexagonal open pore network. In some embodiments, the macroporous ceramic body further comprises multiple layers of three-dimensional open pore network. In some of these embodiments, at least one layer comprises pores of different sizes than the pores of other layers.

In some embodiments, the macroporous ceramic body comprises about 34-40% (w/w) of feldspar and one or more components selected from the group consisting of quartz, ball clay and kaolin. In some of the other embodiments, the macroporous ceramic body further comprises cavities, wherein at least on cavity is in communication with another cavity through a pore. In some of these embodiments, the cavities can be of any different shapes. In some embodiments, the cavities are spherical.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter broadly contemplated by the present invention. It is further understood that the scope of the present invention fully encompasses other embodiments that may become obvious to those skilled in the art and that the scope of the present invention is accordingly limited by nothing other than the appended claims.

EXPERIMENTAL SECTION

Preparation of a Macroporous Ceramic Body

First, spherically shaped polystyrene beads were coated with polyurethane and then the coated polystyrene beads were put into a cylindrical mould. Then coated polystyrene beads were pressed using a wooden piston so that all the polystyrene beads stick with neighboring beads. By doing so a cylindrical polystyrene bead structure was made. Then ceramic slurry (first mixture comprising ceramic-forming components) was extruded in to the polystyrene structure to form a second intermediate mixture comprising the polymer network structure. The said ceramic slurry contained low tech ceramic raw materials. The said ceramic mixture contained feldspar (37.6%), quartz (20.8%), ball clay (20.8%) and kaolin (20.8%) and 0.5 g of sodium silicate per 100 g of ceramic mixture as a binder.

Then the ceramic slurry extruded polystyrene structure was left for air drying. After that air dried ceramic structure was oven dried according to the drying curve presented on FIG. 1 and thereby, the polystyrene beads were removed leaving the porous structure in the body. After the oven drying the porous ceramic structure was sintered according to the sintering curve presented in FIG. 2. The resulting ceramic body is shown in FIG. 3.

The drying curve is designed according to the behavior of melting of polystyrene beads inside the ceramic mixture which being dried. When the ceramic mixture is dried with the impregnated polystyrene structure, the polystyrene beads tend to melt down at a temperature of 140° C. and completely evaporate at a temperature of 350° C. If the drying is done by one segmented drying curve. The tiny ceramic struts may collapse due to the rapid melting and evaporating of polystyrene beads. Therefore after studying the behavior of melting of polystyrene beads inside the ceramic structure, the drying was done according to a new drying curve. Each segment of the drying curve has unique tasks. In the first segment, the polystyrene beads are shrunk. But the shrinking is very low and this procedure is continued for 3 hours. Due to this slow shrinking, the contact between polystyrene beads and the ceramic body is reduced. In addition, the internal moisture of ceramic structure is evaporated in the first drying session. In the second session the shrunk polystyrene beads start to melt but the rate of melting is very low since the temperature is increased by 1° C./min. After 2 hours, the second session of drying is ended but the polystyrene residues are still remaining inside the ceramic body. These residues are completely burnt out in the third session of the drying curve.

Experimental Method of Measuring Porosity

First, the sintered porous ceramic articles were dipped and kept in water for 24 hours and then they were taken out. The cylindrical surface of the porous ceramic structures were wrapped using cellophane papers in order to make the shape of the sample more cylindrical. Using plastic clay which were formed to thin sheets were wrapped around the ceramic structures in such a way that top side of the ceramic cylinder was opened and other surfaces were completely sealed. The water was poured in to the pores of the sintered porous body up to the top edge of the ceramic cylinder. After about 30 minutes the filled water was removed to a measuring cylinder and measured the volume of the water. After that the bulk volume of the samples were measured using a venire caliper. Finally, the ratio between total void volume and the bulk volume was obtained and hence the porosity was obtained.

TABLE 1

Porosity values of the sintered porous ceramic samples:

| Sample (the size of the used beads is indicated in this column) | Porosity % |
|---|---|
| 5 mm | 48.2 |
| 6 mm | 52.7 |
| 7 mm | 60.8 |
| 8 mm | 49.7 |
| 9 mm | 51.7 |

What is claimed is:

1. A method of preparing a macroporous ceramic body having a three-dimensional porous network, comprising the steps of:
combining a first mixture comprising ceramic-forming components with a three-dimensional polymer network structure to form a second intermediate mixture comprising a polymer network, wherein the three-dimensional polymer network comprises a polymer bead and wherein the polymer bead has a coating of polyurethane; and
drying and sintering the second intermediate mixture to prepare the macroporous ceramic body, wherein the three-dimensional polymer network comprises interconnected, three-dimensional figures.

2. The method of claim 1, wherein the macroporous ceramic body comprises cavities of about 3 mm to about 11 mm.

3. The method of claim 1, wherein the polymer bead is selected from the group consisting of polystyrene, polyethylene oxide, polymethyl methacrylate, polybutadiene and polyisoprene.

4. The method of claim 1, wherein the polymer bead are of substantially uniform size.

5. The method of claim 1, wherein the polymer bead are of varying sizes.

6. The method of claim 1, wherein the first mixture comprising ceramic-forming components is selected from the group consisting of feldspar, quartz, ball clay kaolin and mixtures thereof.

7. The method of claim 6, wherein the first mixture further comprises a binder selected from the group consisting of sodium silicate, potassium silicate and magnesium aluminum silicate.

8. The method of claim 6, wherein the first mixture contains about 34-40% (w/w) of feldspar, about 17-23% (w/w) of quartz, about 17-24% (w/w) of ball clay and about 18-24% (w/w) of kaolin.

9. The method of claim 8, wherein the first mixture further comprising about 0.5 g of sodium silicate per 100 g of the first mixture.

10. The method of claim 1, wherein the drying step comprises heating at 80° C. for about 2 hours, 140° C. for about 2 hours and 350° C. for about 2 hours, and wherein the rate of increasing the temperature is about 1° C. per minute.

11. The method of claim 1, wherein the sintering step comprises heating at 1240° C. for about 150 minutes.

12. The method of claim 1, wherein the macroporous ceramic body further comprises a cavity having a spherical shape.

13. The method of claim 12, wherein at least one cavity is in communication with another cavity through a pore.

14. The method of claim 13, wherein the cavity contains from about 1 to about 12 pores.

* * * * *